United States Patent
Eller et al.

(10) Patent No.: US 10,983,028 B2
(45) Date of Patent: Apr. 20, 2021

(54) PLANETARY GEAR ARRANGEMENT

(71) Applicant: Aktiebolaget SKF, Gothenburg (SE)

(72) Inventors: Michael Eller, Hassfurt (DE); Luk Geens, Lint (BE); Michael Gierling, Langenargen (DE); Jens Graf, Schweinfurt (DE); Charlotte Olivier, Tours (FR); Johannes Schaefer, Friedrichshafen (DE); Kris Smolders, Turnhout (BE); Georg Tenckhoff, Friedrichshafen (DE); Andre Tubbesing, Uithoorn (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/247,043

(22) Filed: Jan. 14, 2019

(65) Prior Publication Data

US 2019/0226942 A1 Jul. 25, 2019

(30) Foreign Application Priority Data

Jan. 22, 2018 (DE) .......................... 10 2018 200 933

(51) Int. Cl.
*G01M 13/021* (2019.01)
*F16H 57/08* (2006.01)
*F16H 57/01* (2012.01)

(52) U.S. Cl.
CPC .......... *G01M 13/021* (2013.01); *F16H 57/08* (2013.01); *F16H 2057/012* (2013.01)

(58) Field of Classification Search
CPC .................................................. G01M 13/021
See application file for complete search history.

(56) References Cited

U.S. PATENT DOCUMENTS

| | | | |
|---|---|---|---|
| 2003/0030565 A1* | 2/2003 | Sakatani | G01H 1/003 340/679 |
| 2007/0030162 A1* | 2/2007 | Okada | F16C 19/52 340/682 |
| 2014/0046614 A1* | 2/2014 | Pettersson | G01M 13/04 702/113 |
| 2019/0136945 A1* | 5/2019 | Nies | F16H 57/082 |
| 2020/0072339 A1* | 3/2020 | Poster | F16H 57/082 |

FOREIGN PATENT DOCUMENTS

| | | |
|---|---|---|
| DE | 3020965 A1 | 5/2016 |
| DE | 202016106888 U1 | 2/2017 |
| WO | WO-2011104433 A1 * 9/2011 | ............... H04Q 9/00 |

* cited by examiner

*Primary Examiner* — Timothy Hannon
(74) *Attorney, Agent, or Firm* — WRB-IP LLP

(57) ABSTRACT

In a planetary gear arrangement with a planetary gear which includes a rotating part and a non-rotating part, and with a sensor module for sensing properties of the planetary gear, the sensor module includes a sensor as well as a first sending/receiving unit and a second sending/receiving unit, wherein the sensor and the first sending/receiving unit are coupled and arranged at the rotating part, and wherein the second sending/receiving unit is arranged at the non-rotating part, wherein the first sending/receiving unit and the second sending/receiving unit are configured for being inductively coupled, wherein the first sending/receiving unit includes an energy storage, wherein the energy storage is configured for being charged during each turn of the rotating part for powering the sensor via the first sending/receiving unit in order to perform measurements.

7 Claims, 2 Drawing Sheets

PLANETARY GEAR ARRANGEMENT

BACKGROUND AND SUMMARY

The present invention relates to a planetary gear arrangement with a planetary gear and sensor module.

In gears, such as planetary gears, it can be necessary to monitor different conditions of the gear during operation. For this purpose, a sensor can be provided in the gear. As this sensor has to be powered, the sensor is often arranged in the non-rotating part of the gear since at this position, an energy supply via cable is easily possible. However, if the sensor is arranged in the rotating part of the gear, an energy supply via battery is necessary for this purpose, wherein the battery will be arranged in the rotating part for enabling a connection to the sensor. With such a battery, it is only possible to provide energy for a limited time, namely until the battery is discharged.

For example, from DE 20 2016 106 888 U1, a device for condition monitoring of a gear element, in particular a gear of a wind turbine, is known. Thereby, the device comprises, in addition to a sensor element, also an energy supply unit which supplies electrical energy to the sensor element. The energy supply unit may be for example a nanogenerator for generating electrical energy, an energy storage or a wireless energy transmission. The transmission of the sensed condition values can be wirelessly carried out. The sensor element is either directly integrated at a source of the condition values or at least indirectly connected to the source of the condition values via a couple medium. This leads to an improvement of the signal quality of the condition values to be sensed.

It is thus desirable to provide an improved planetary gear arrangement in which a sensor may be arranged in the rotating part of the planetary gear and may be easily powered.

According to an aspect of the present invention, a planetary gear arrangement comprises a planetary gear with a rotating part and a non-rotating part and a sensor module for sensing properties of the planetary gear. For this purpose, the sensor module comprises a sensor as well as a first sending/receiving unit and a second sending/receiving unit. The sensor and the first sending/receiving unit are arranged in the rotating part. Hereby, properties of the planetary gear may be sensed directly at the rotating part. For powering the sensor and for retrieving the sensed properties from the sensor, the sensor is coupled to the first sending/receiving unit. This connection may be made by means of a wired coupling.

The second sending/receiving unit is arranged at the non-rotating part. For being able to power the sensor, the first sending/receiving unit and the second sending/receiving unit configured to be inductively coupled during a rotation of the rotating part. During a rotation of the rotating part, the first sending/receiving unit is passed by the second sending/receiving unit in regular intervals, wherein an inductive coupling takes place when the two sending/receiving units are facing each other. Hereby, an energy transmission takes place from the second sending/receiving unit to the first sending/receiving unit. This transmission occurs every time, when the two sending/receiving units are inductively coupled, i.e. when they are passing by each other. This occurs once per rotation round.

Furthermore, the first sending/receiving, unit may comprise an energy storage. The energy storage may be for example a capacitor. The energy storage may be charged during each turn of the rotating part, i.e. every time, when there is an inductive coupling between the two sending/receiving units. Thereby, it can be achieved that the sensor has sufficient energy at its disposal via the first sending/receiving unit for carrying out measurements. However, the energy storage only has to be large enough that it can store enough energy for ensuring an energy supply of the sensor until a recharging of the energy storage may be carried out. For example, enough energy may be stored by means of the energy storage for supplying energy to the sensor also if no turn of the rotating part takes place or if there is no inductive coupling during the turn. The energy storage may thus serve as energy buffer.

It is also possible that the energy storage first needs to be charged until it has a sufficient capacity in order to be able to power the sensor.

In contrast to a battery which shall supply energy to the sensor, as it has been the case in systems known until now, the energy storage as herein provided may be configured very small as it has not to ensure the complete energy supply. Instead, the energy is provided by means of the inductive coupling, wherein the energy storage only serves as buffer.

The planetary gear arrangement may comprise multiple sensor modules. In particular, the planetary gear arrangement, which comprises multiple planets, may comprise one sensor module per planet. Each sensor module may comprise multiple sensors. For example, one sensor module may comprise a vibration sensor, a temperature sensor and/or an accelerometer. The sensor and the first sending/receiving unit may be configured as one integral unit.

The sensor module may comprise a computing unit which is arranged in the rotating part. The computing unit may be used for performing a preprocessing of the sensed properties. Thereby, data, which are already preprocessed, may be transmitted to the second sending/receiving unit, thereby reducing the amount of data which needs to be transmitted.

According torn embodiment, the sensor is configured for transmitting sensed properties of the planetary gear via the first sending/receiving unit to the second sending/receiving unit. This transmission may be carried out using the inductive coupling between the sending/receiving units. At the same time, the inductive coupling between the two sending/receiving units is used for supplying energy to the first sending/receiving unit.

Alternatively, the transmission of the sensed properties may be carried out via a radiocommunication. In this case, the first and the second sending/receiving unit additionally comprise a radio transmitting element, for example an RFID element. The transmission may be bidirectionally configured so that information from the second sending/receiving unit, for example from an external control unit, may be transmitted to the sensor. This information may serve for initiating the sensing of properties by the sensor.

According to an embodiment, the second sending/receiving unit comprises a transmitting coil and the first sending/receiving unit comprises a receiving coil. Energy may be easily transmitted to the receiving coil by means of the transmitting coil via an inductive coupling, i.e. without a direct connection.

According to an embodiment, the energy may be supplied via the second sending/receiving unit from an external energy supply being connected to the second sending/receiving unit. This connection can be made for example via a cable by means of which the second sending/receiving unit may be connected to a current/voltage source. With an inductive coupling between the transmitting and the receiving coil, the energy is transmitted from the external energy supply via the transmitting coil to the receiving coil.

Thus, the inductive coupling between the two sending/receiving units serves for transmitting energy as well as for transmitting data. Thus, the first sending/receiving unit and the sensor, which is provided for sensing properties of the planetary gear, may be easily arranged in the rotating, part of the planetary gear, while the energy supply, which is carried out by the second sending/receiving unit, may be arranged in the non-rotating part.

As by this arrangement, there is no need to provide a battery in the rotating part of the planetary gear, space may be saved within the gear. By means of the inductive coupling, the sensor, however, may be easily powered. Furthermore, the planetary gear arrangement will be more robust by omitting of a battery since the planetary gear arrangement is less prone to failures due to the battery. Thereby, the lifetime of the whole arrangement will be increased.

The second sending/receiving unit can be connected to a processing unit. In one embodiment, this connection may be carried out via the same cable as the connection to the external energy supply. The processing unit may be configured to receive and to process the properties of the planetary gear sensed by the sensor or to transmit the properties to further units. The processing unit may be configured as gateway which provides a connection between the sensor module and external systems as a hardware and/or a software component. This gateway may perform different functions, such as receiving and transmitting of data to/from the sensor (via the first and second sending/receiving unit) and powering the second sending/receiving unit. As the gateway may be arranged outside of the gear, there is sufficient space for powering the gateway via a standard energy supply.

According to an embodiment, the energy storage may be arranged in the rotating part of the planetary gear, for example a shaft, axis or planetary pin of the planetary gear. Thereby, the energy storage may rotate together with the first sending/receiving unit.

Further advantages and preferred embodiments are disclosed in the description, the figures and the claims. In particular, the combinations of features being disclosed in the description and the figures are solely exemplary so that features may be present also individually or combined otherwise.

BRIEF DESCRIPTION OF THE DRAWINGS

In the following, the present invention will be described in more detail by means of embodiments shown in the figures. The embodiments and the combinations shown in the embodiments are exemplarily, only, and are not intended to limit the scope of protection. The scope of protection is solely defined by the pending claims.

It is shown.

DETAILED DESCRIPTION

Figure 1:
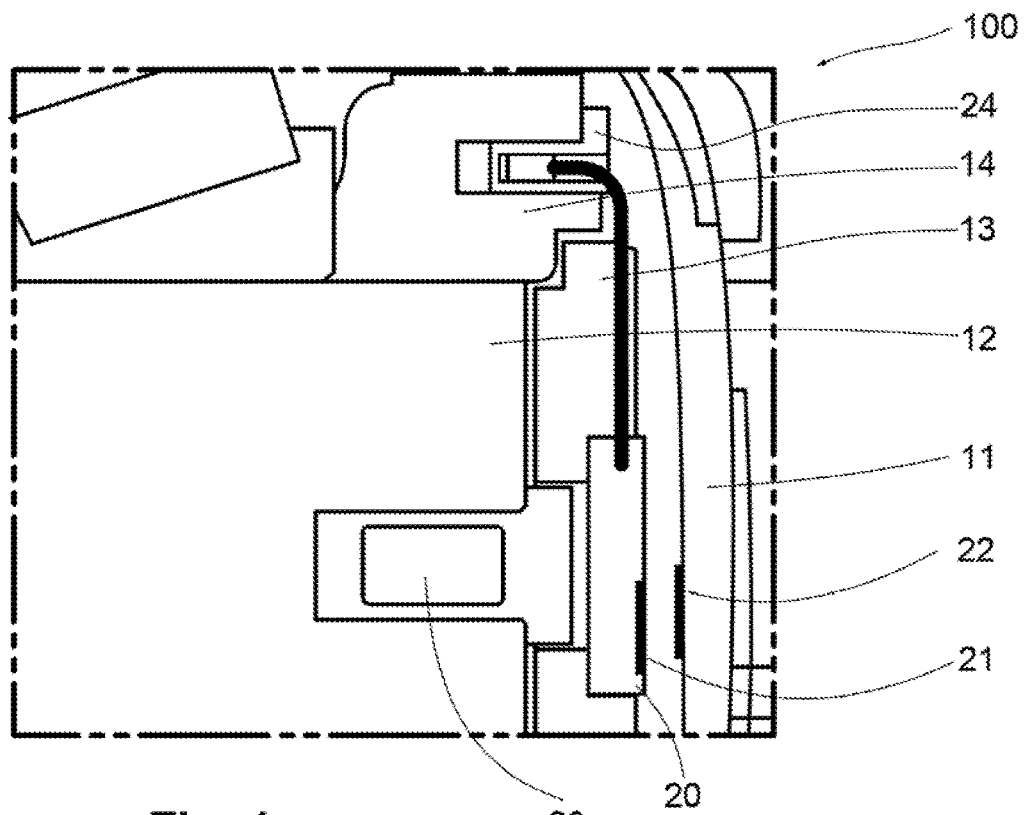
FIG. 1: a sectional view of a planetary gear arrangement with a sensor module.

In the following same or similar functioning, elements are indicated with the same reference numerals.

In FIG. 1, a planetary gear arrangement 100 is shown. The planetary gear arrangement comprises a rotating part 12, for example a shaft, axis or planetary pin, which is supported in a planetary carrier 14. The rotating part 12, illustrated as planetary pin in FIG. 1, is covered by a cover 13. The rotating part 12, the cover 13 and the planetary carrier 14 are enclosed by a housing 11.

A sensor module 20 is provided for sensing properties of the planetary gear. Here, a first sending/receiving unit 21 is provided in the rotating part of the planetary gear, i.e. in this case in the cover 13. The second sending/receiving unit 22 is arranged at a non-rotating part of the planetary gear, in this case in the housing 11.

The first sending/receiving unit 21 is powered via an inductive coupling to the second sending/receiving unit 22. Optionally, an energy storage or battery 23, respectively, may be provided which is coupled to the first sending/receiving unit 21. When an energy storage 23 is provided, the energy storage 23 may be powered and charged during an inductive coupling between the second sending/receiving unit 22 and the first sending/receiving unit 21. Thereby, the first sending/receiving unit 21, and thus a sensor which may be part of the first sending/receiving unit 21, may also be powered if there is no inductive coupling between the second sending/receiving unit 22 and the first sending/receiving unit 21.

The energy storage 23 may be for example a capacitor which is charged during each turn, i.e. every time, when an inductive coupling between the two sending/receiving units 21, 22 takes place. For example, the energy storage 23 may store energy during each turn until the energy is sufficient for powering the sensor also if no turn takes place or in case if there is no inductive coupling during the turn.

The (optional) energy storage 23 may be configured very small since it needs not to ensure the complete energy supply. Instead, the energy is provided via the inductive coupling and the energy storage 23 only serves as a buffer.

The sensor module 20 may additionally comprise an external sensor 24, which is for example provided in the planetary carrier 14. Such an external sensor 24 may be used for example for sensing a vibration or temperature.

Figure 2:
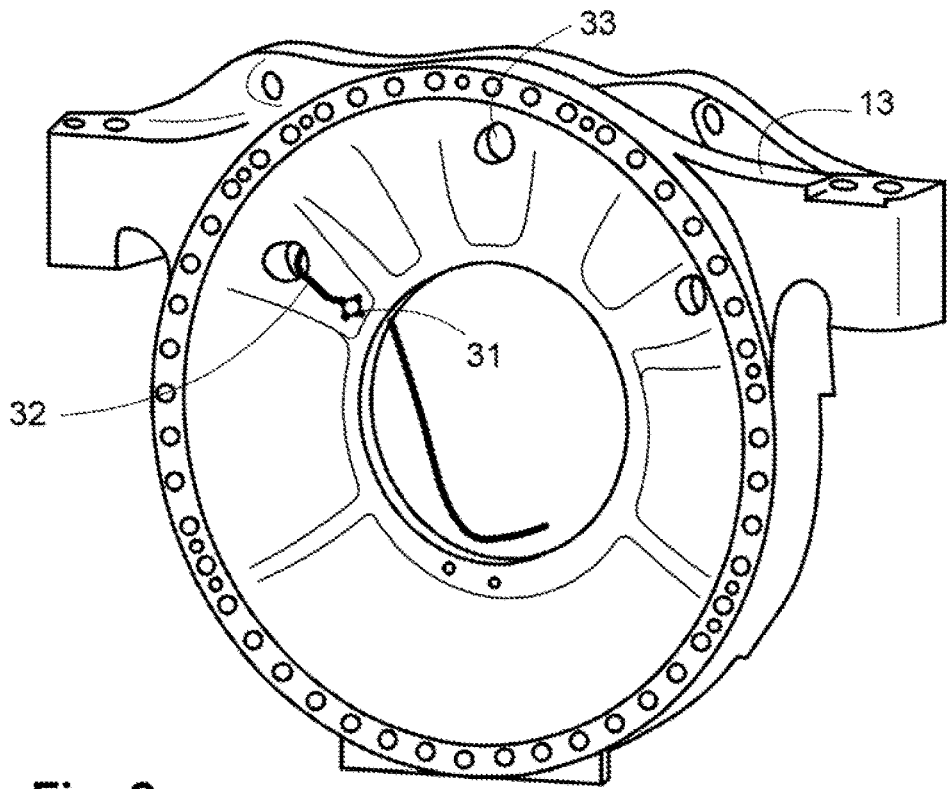
FIG. 2: a perspective view of a cover of the planetary gear arrangement of FIG. 1 with an energy supply.

As shown in FIG. 2, an energy supply 31 may be provided at the housing 13 of the planetary gear. The energy supply 31 may be connected via a cable 32 with the second sending receiving unit 22 of the sensor module 20. The cable 32 may be passed through through holes 33 which are provided in the housing 13.

Figure 3:
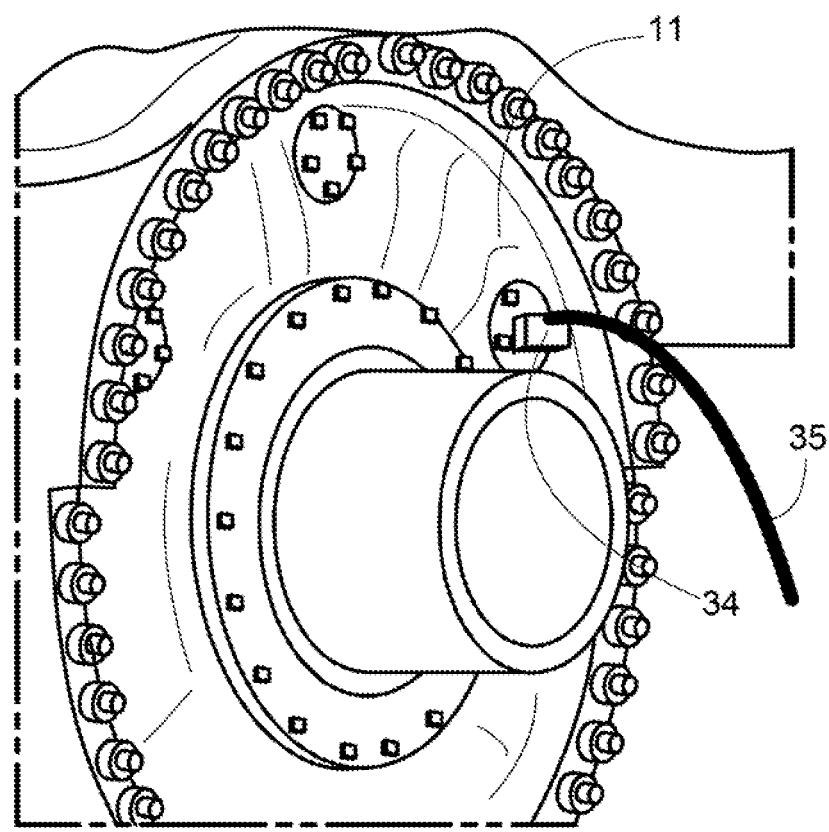
FIG. 3: a perspective view of a housing of the planetary gear arrangement of FIG. 1 with a processing unit.

Data being sensed by the sensor module 20 may be transmitted via the second sending/receiving unit 22 to an external processing unit 34, which is shown in FIG. 3. The external processing unit may be arranged at the planetary housing 11. The external processing unit 34, which may also be referred to as a gateway, is coupled to the second sending/receiving unit 22 for receiving data from the second sending/receiving unit 22, which has been transmitted from the first sending/receiving unit 21. The external processing unit 34 can be coupled to further units (not shown) via a cable 35.

With the proposed planetary gear arrangement, it is thus possible to arrange a sensor at a rotating part of the planetary gear, which is powered only via an inductive coupling and thus has no wired connection to the non-rotating part of the planetary gear arrangement. The connection to an energy supply and an external processing unit is carried out only via an inductive coupling between the sending/receiving units.

LIST OF REFERENCE SIGNS

11 planetary gear housing
12 rotating part
13 cover 14 planetary carrier
20 sensor module
21 first sending/receiving unit
22 second sending/receiving unit
23 energy storage
24 external sensor
31 energy supply
32 cable
33 through hole
34 processing unit
35 cable
100 planetary gear arrangement

The invention claimed is:

1. A planetary gear arrangement, comprising
a gear, the gear comprising a rotating part and a non-rotating part, and
a sensor module for sensing properties of the planetary gear, wherein the sensor module comprises a sensor as well as means for powering the sensor including a first sending/receiving unit and a second sending/receiving unit, wherein the sensor and the first sending/receiving unit are coupled and arranged at the rotating part, and wherein the second sending/receiving, unit is arranged at the non-rotating part, wherein the first sending/receiving unit and the second sending/receiving unit are inductively coupled,
wherein the first sending/receiving unit comprises an energy storage, and wherein the energy storage is charged during each turn of the rotating part and powers the sensor via the first sending/receiving unit in order to perform measurements,
wherein the energy storage is arranged in a rotating part of the planetary gear, the rotating part being a shaft, a axis, or a planetary pin.

2. The planetary gear arrangement according to claim 1, wherein the first sending/receiving unit is powerable via the inductive coupling to the second sending/receiving unit.

3. The planetary gear arrangement according to claim 1, wherein the sensor is configured for transmitting sensed properties of the planetary gear via the first sending/receiving unit to the second sending/receiving unit.

4. The planetary gear arrangement according to claim 1, wherein the first sending/receiving unit composes a receiving coil and the second sending/receiving unit comprises a transmitting coil.

5. The planetary gear arrangement according to claim 1, wherein the second sending/receiving unit is connected to an external energy supply.

6. The planetary gear arrangement according to claim 1, wherein the second sending/receiving unit is connected to a processing unit.

7. The planetary gear arrangement according to claim 1, wherein the energy storage is a capacitor.

* * * * *